US011270427B2

(12) United States Patent
Hsu et al.

(10) Patent No.: US 11,270,427 B2
(45) Date of Patent: Mar. 8, 2022

(54) SYSTEM AND METHOD FOR ESTABLISHING A JUNCTION TRACE OF AN ASSEMBLY

(71) Applicant: Industrial Technology Research Institute, Hsinchu (TW)

(72) Inventors: Bing-Cheng Hsu, Changhua County (TW); Cheng-Kai Huang, Taichung (TW); Jan-Hao Chen, Changhua County (TW); Chwen-Yi Yang, Hualien County (TW); Yi-Ying Lin, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 34 days.

(21) Appl. No.: 16/809,576

(22) Filed: Mar. 5, 2020

(65) Prior Publication Data

US 2021/0209744 A1 Jul. 8, 2021

(30) Foreign Application Priority Data

Jan. 6, 2020 (TW) .................................. 109100280

(51) Int. Cl.
*G06T 7/00* (2017.01)
*G06T 7/149* (2017.01)
(Continued)

(52) U.S. Cl.
CPC ........... *G06T 7/0004* (2013.01); *A41H 3/007* (2013.01); *A43D 1/08* (2013.01); *B25J 18/00* (2013.01);
(Continued)

(58) Field of Classification Search
None
See application file for complete search history.

(56) References Cited

U.S. PATENT DOCUMENTS 7,747,080 B2   6/2010   Chang et al.
8,229,226 B2   7/2012   Chuang et al.
(Continued)

FOREIGN PATENT DOCUMENTS

CN   101122457   9/2010
CN   104525424   4/2015
(Continued)

OTHER PUBLICATIONS

Heping Chen, et al., "Flexible assembly automation using industrial robots." 2008 IEEE International Conference on Technologies for Practical Robot Applications, Nov. 10-11, 2008, pp. 46-51.
(Continued)

*Primary Examiner* — Oneal R Mistry
*Assistant Examiner* — Nicolas James Boyajian
(74) *Attorney, Agent, or Firm* — JCIPRNET

(57) ABSTRACT

A system for establishing a junction trace of an assembly includes a surface model creating module, a processing module, and a material inspection module. The assembly includes a first part and a second part assembled with each other. The surface model creating module scans the first part and the second part to separately establish first surface model data and second surface model data. The processing module establishes assembled surface model data according to the first surface model data and the second surface model data, determines a junction region from the assembled surface model data, and determines inspection points mapped on the assembly according to the junction region. The material inspection module inspects materials of the assembly at the inspection points. The processing module establishes a junction trace of the first part and the second part in the assembly according to a material inspection result.

19 Claims, 8 Drawing Sheets

(51) Int. Cl.
  *G06T 7/11* (2017.01)
  *A43D 1/08* (2006.01)
  *A41H 3/00* (2006.01)
  *B25J 18/00* (2006.01)
  *G05B 19/418* (2006.01)

(52) U.S. Cl.
  CPC .......... *G05B 19/41885* (2013.01); *G06T 7/11* (2017.01); *G06T 7/149* (2017.01); *A43D 2200/10* (2013.01)

(56) References Cited

U.S. PATENT DOCUMENTS

| | | | |
|---|---|---|---|
| 9,389,315 | B2 | 7/2016 | Bruder et al. |
| 10,228,682 | B2 | 3/2019 | Colaianni et al. |
| 2006/0165268 | A1* | 7/2006 | Kaus .......... G06T 7/60 382/128 |
| 2015/0041654 | A1* | 2/2015 | Barychev .......... G01N 21/3581 250/338.4 |
| 2016/0026174 | A1* | 1/2016 | Eitzenberger .......... G01G 19/00 700/97 |
| 2016/0334535 | A1* | 11/2016 | Dreiseitel .......... G01V 5/005 |
| 2017/0272728 | A1 | 9/2017 | Rafii et al. |
| 2020/0043245 | A1* | 2/2020 | Morard .......... G06T 19/20 |

FOREIGN PATENT DOCUMENTS

| | | |
|---|---|---|
| CN | 104146442 | 8/2015 |
| CN | 105686219 | 6/2016 |
| CN | 104766325 | 12/2017 |
| CN | 107464156 | 12/2017 |
| CN | 104807418 | 1/2018 |
| CN | 104969029 | 11/2018 |
| EP | 3251536 | 12/2017 |
| JP | 2017226947 | 12/2017 |
| JP | 6415447 | 10/2018 |
| TW | I457793 | 10/2014 |
| TW | I599757 | 9/2017 |

OTHER PUBLICATIONS

Yuzhen Jin, et al., "Detection of 3D curve for shoe sole spraying based on laser triangulation measurement." Proceedings of the IEEE International Conference on Automation and Logistics, Aug. 5-7, 2009, pp. 865-868.

R. Hansch, et al., "Comparison of 3D interest point detectors and descriptors for point cloud fusion." ISPRS Annals of the Photogrammetry, Remote Sensing and Spatial Information Sciences, vol. II-3, Sep. 2014, pp. 57-64.

Si-Yu Chen, "Vision-Based detection and spraying system for shoemaking," Master's thesis, Jan. 2017, Department of Mechanical Engineering, National Yunlin University of Science & Technology, pp. 1-165.

Wu Chuanyu, et al., "CAD-Based Method for Generating Spraying Trajectory of Adhesive on Shoe Soles." Journal of Computer-aided Design & Computer Graphics, vol. 20, No. 5, May 2008, pp. 678-682.

\* cited by examiner

SYSTEM AND METHOD FOR ESTABLISHING A JUNCTION TRACE OF AN ASSEMBLY

CROSS-REFERENCE TO RELATED APPLICATION

This application claims the priority benefit of Taiwan application serial no. 109100280, filed on Jan. 6, 2020. The entirety of the above-mentioned patent application is hereby incorporated by reference herein and made a part of this specification.

BACKGROUND

Technical Field

The disclosure relates to a system and a method for inspecting a junction of an assembly, and more particularly, relates to a system and a method for establishing a junction trace of an assembly.

Description of Related Art

Along with the development of automation technology, manufacturers have begun to introduce automation equipment into the production of various types of products with an aim to replace manpower, and 3D (dirty, dangerous, and difficult) industry, in particular, is the first industry to make such introduction. Nevertheless, for industries except the metal industry, the processing results of various parts may be easily affected by factors such as processing conditions or special properties of materials (flexible materials, foaming materials, etc.). As a result, sizes of parts may vary considerably, and it is thus difficult to establish an accurate processing trace and introduce automation equipment. Manufacturing of products still depends heavily on manpower at present. Taking the footwear manufacturing industry for example, in the processing of footwear, a large amount of chemicals are used, so the footwear manufacturing industry is categorized as the 3D industry. Nevertheless, as affected by various factors such as material restriction, complex processing conditions (during sewing, the sizes of uppers vary greatly, and a large number of colors and various types of materials are used) and so on, introduction of automation into such industry is not as easy as expected.

SUMMARY

The disclosure provides a system for establishing a junction trace of an assembly capable of facilitating establishment of a correct junction trace of an assembly.

The disclosure further provides a method for establishing a junction trace of an assembly capable of establishing a correct junction trace of an assembly to improve a manufacturing yield of a processing process of the assembly.

In the disclosure, a system for establishing a junction trace of an assembly includes a surface model creating module, a processing module, and a material inspection module. The assembly includes a first part and a second part assembled with each other. The surface model creating module scans the first part and the second part to separately establish first surface model data and second surface model data. The processing module establishes assembled surface model data according to the first surface model data and the second surface model data, determines a junction region from the assembled surface model data, and determines inspection points mapped on the assembly according to the junction region. The material inspection module inspects materials of the assembly at the inspection points. The processing module establishes a junction trace of the first part and the second part in the assembly according to a material inspection result.

In the disclosure, a method for establishing a junction trace of an assembly includes the following steps but is not limited thereto. A first part and a second part are scanned to separately establish first surface model data and second surface model data. Assembled surface model data is established according to the first surface model data and the second surface model data, a junction region is determined from the assembled surface model data, and inspection points mapped on the assembly are determined according to the junction region. Materials of the assembly at the inspection points are inspected. A junction trace of the first part and the second part in the assembly is established according to a material inspection result.

To sum up, in the system and the method provided by the embodiments of the disclosure, the junction region of the first part and the second part in the assembly are found through the image visual system, and moreover, points of the junction trace are determined based on the result of material analysis. Therefore, the junction trace established through the embodiments of the disclosure may correctly reflect the actual state of the assembly assembled by the first part and the second part, so that a correct processing path of the parts is provided, and the processing yield of the parts is improved.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
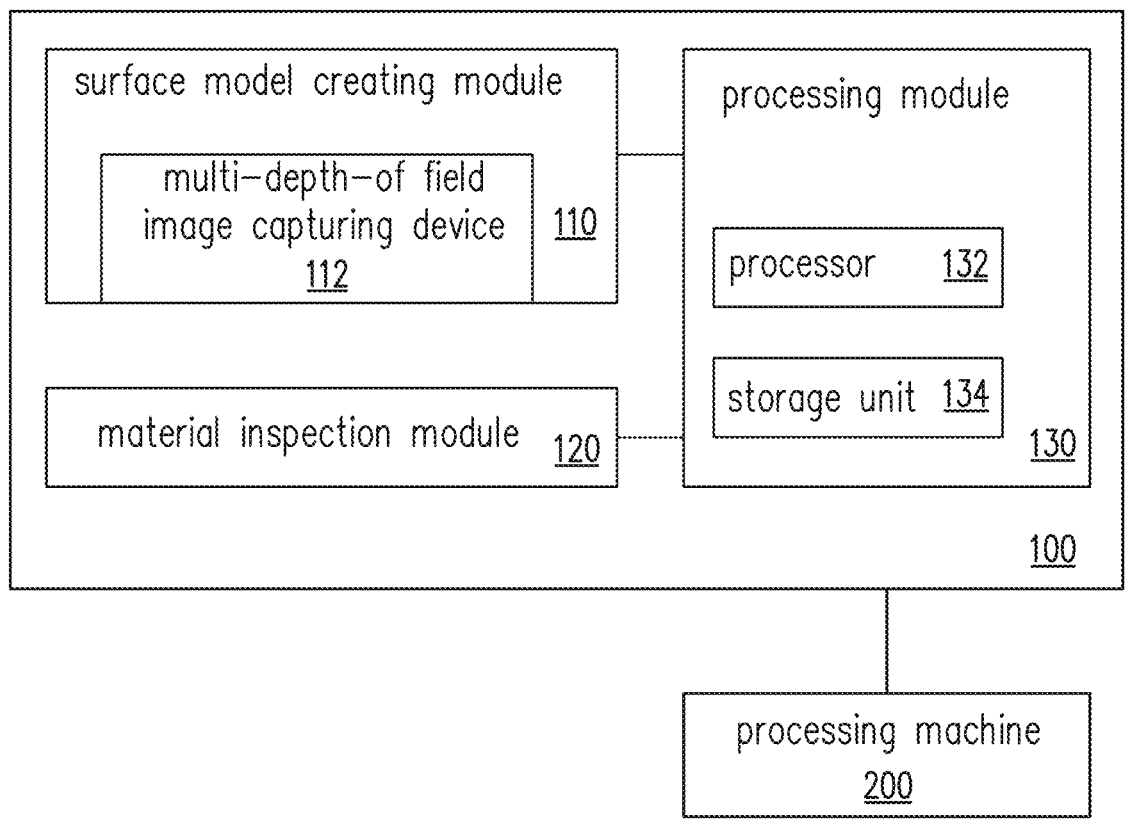
FIG. 1 is a schematic view of a system for establishing a junction trace of an assembly according to an exemplary embodiment of the disclosure.

FIG. 1 is a schematic view of a system for establishing a junction trace of an assembly according to an exemplary embodiment of the disclosure. In FIG. 1, a system 100 for establishing a junction trace of an assembly 100 includes a surface model creating module 110, a material inspection module 120, and a processing module 130. The processing module 130 communicates with and is connected to the surface model creating module 110, may communicate with and be connected to the material inspection module 120 as well, and may be configured to establish a junction trace of an assembly. The system 100 for establishing a junction trace of an assembly may provide information of an established junction trace to a processing machine 200, so that the processing machine 200 may plan a processing process path according to the junction trace of the assembly. In some embodiments, information obtained by the surface model creating module 10 may be analyzed, calculated, compared, and converted by the processing module 130, and that an inspection path or inspection points are obtained. The material inspection module 120 may inspect the assembly according to the inspection path or the inspection points obtained by the processing module 130. The processing module 130 may further determine required information according to a result inspected by material inspection module 120. Overall, the system 100 may be configured to analyze individual surface information of a first part and a second part, establish a junction trace when the two parts are assembled into an assembly, and provide information of the junction trace to the processing machine 200 to apply processing of the first part and/or the second part and set processing of the first part and/or the second part to be automated. In some embodiments, the system 100 may be applied to processing of a footwear product. For instance, the first part may be an upper, and the second part may be a sole model.

When a footwear product is manufactured, the upper is required to be bonded to the sole, and that a complete shoe may be obtained. Generally, materials of the upper and the sole are significantly different, and the upper is made of a flexible material, such as cloth, leather, fabric, and so on. It is thus not easy to bond and process the upper and the sole. For instance, the upper is required to be sleeved on a shoe last or on other similar jigs (may be called as a last-stretched upper). A bonding material such as glue may be coated on a bottom portion of the upper to be bonded to the sole part, on an inner surface of the sole to be bonded to the upper part, or on both the upper and the sole. Next, a glued part of the last-stretched upper and a glued-part of the sole are set to abut against and perform pressure-applying on each other, and bonding between the upper and the sole is completed after the bonding material is cured. In such as manufacturing process, since the upper and the sole are flexible to some extent, especially the upper, abutting and combining of the upper and the sole may set the upper, the sole, or both, to be deformed. As such, the glued parts may be easily exposed or displaced owing to inaccurate alignment or other production factors, and a yield of the footwear product may thereby not be increased. Therefore, a junction trace to be applied to the processing process is required to be correctly defined when the upper is combined with the sole.

In this embodiment, the surface model creating module 110 may be configured to scan the first part and the second part to obtain first surface model data of the first part and second surface model data of the second part. The surface model creating module 110 includes a multi-depth-of-field image capturing device 112, such as a multi-field-of-view camera, a stereo camera, a stereo image capturing device, etc. The surface model creating module 110 may scan appearances of the first part and the second part to be analyzed and establish the first surface model data of the first part and the second surface model data of the second part. For instance, after scanning the first part and the second part, the surface model creating module 110 may establish a point cloud for each part and transmit point cloud information to the processing module 130, so as to facilitate calculation and analysis performed by the processing module 130. In another part of the embodiment, the surface model creating module 110 includes not only a camera capable of capturing a surface image but also a built-in processor. Further, the built-in processor may analyze an image obtained by the camera and/or corresponding surface information to obtain the first surface model data and the second surface model data and provides the established first surface model data and the second surface model data to the processing module 130. In other words, the surface model data of each part, such as creation of the point cloud, may be established by the processing module 100 and may also be established by the surface model creating module 110, which is not limited by the disclosure.

The material inspection module 120 may be configured to inspect a material of an object surface. The material inspection module 120 may be a nondestructive material inspection device. That is, the material inspection module 120 may inspect a material of an object surface without destructing the object, and thereby, the inspected object may still be processed and manufactured as a final product. In some embodiments, the material inspection module 120 may include an X-ray fluorescence spectrometer (XRF), an atomic force microscope (AFM), a conductive atomic force microscope (C-AFM), a cross section polisher (CP), a scanning electron microscope/energy-dispersive X-ray spectroscopy (SEM/EDS), dual-beam focused ion beam/energy-dispersive X-ray spectroscopy (DB FIB/EDS), a transmission electron microscope/energy-dispersive X-ray spectroscopy (TEM/EDS), or other similar devices. An inspection result obtained by the material inspection module 120 may be used as a basis for determining required information.

In some embodiments, the processing module 130 may include a processor 132 and a storage unit 134. The first surface model data and the second surface model data obtained by the surface model creating module 110 may be stored in the storage unit 134 and may be provided to the processor 132 for being processed such as being analyzed or compared. In some embodiments, the processor 132 may compare and analyze the first surface model data and the second surface model data to obtain required information. For instance, the processor 132 is adapted to assemble the first surface model data with the second surface model data into assembled surface model data and determines a junction region from the assembled surface model data when the first part and the second part are assembled into an assembly. In addition, the processor 132 may further determine inspection points mapped on the assembly according to the determined junction region. The processing module 130 may provide the determined inspection points to the material inspection module 120, so that the material inspection module 120 may inspect materials of the assembly at the inspection points. That is, the material inspection module 120 may perform an inspection step according to the inspection points and/or an inspection path provided by the processing module 130. Next, the processor 132 may further establish a junction trace of the first part and the second part in the assembly according to the inspection result of the material inspection module 120. In this way, the junction trace of the first part and the second part in the assembly is estimated not only by applying a surface model of an image but also taking parameters of the materials into account. In this way, an actual junction line is correctly reflected to be applied in a subsequent automation process.

For instance, when the first part and the second part respectively act as an upper and a sole model, the junction trace established by the system 100 may act as a basis for a subsequent glue-applying process. Herein, when the upper is placed in a forward direction, a portion of the upper below the junction trace may be set as an area that may be applied by glue. Therefore, the junction trace may be configured to determine a processing trace of the glue-applying process. Nevertheless, the junction trace may also be applied in subsequent processes besides the glue-applying process and may be applied in other processes as well.

Figure 2:
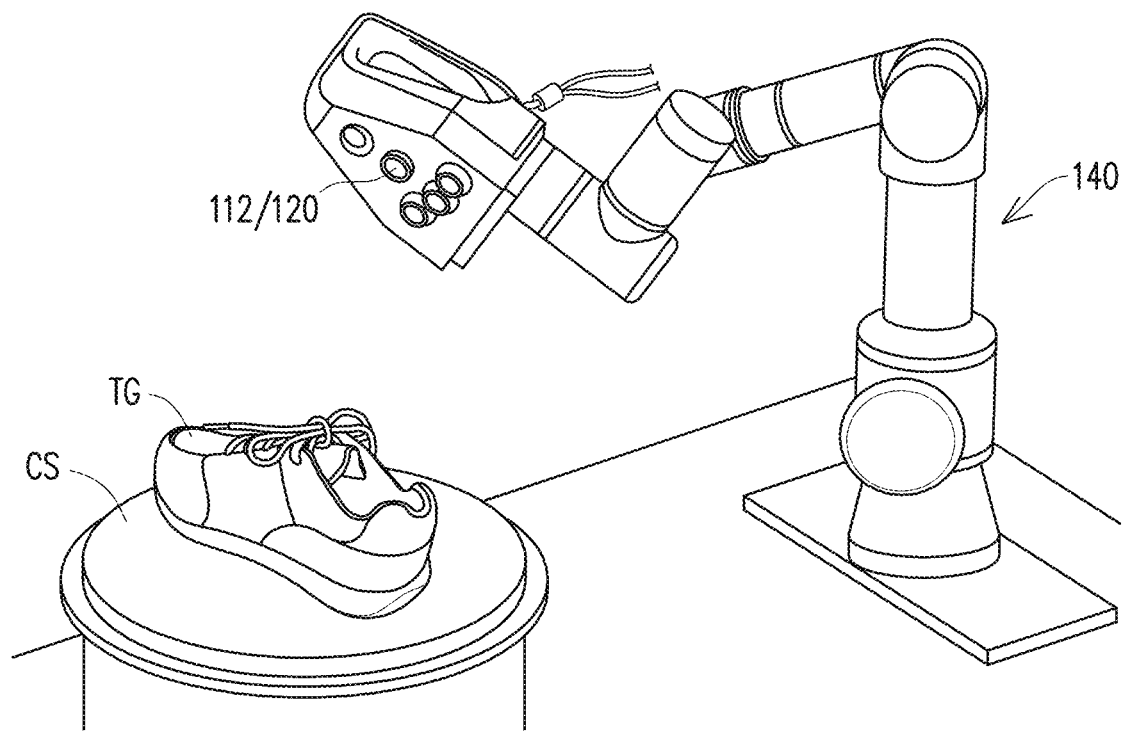
FIG. 2 is a schematic view of an automation carrier according to an exemplary embodiment of the disclosure.

In addition, any one or both of the surface model creating module 110 and the material inspection module 120 may further include an automation carrier (not shown in FIG. 1). The automation carrier may be, for example, a multi-axis robot arm, and the automation carrier may drive a carrying device to rotate, move, etc. in multiple axial directions according to information provided by the processing module 130. In some embodiments, the surface model creating module 110 and the material inspection module 120 may include different automation carriers and may also share the same automation carrier. For instance, FIG. 2 is a schematic view of an automation carrier according to an exemplary embodiment of the disclosure. In FIG. 2, an automation carrier 140 is, for example, a multi-axis robot arm. Moreover, when the automation carrier 140 is applied to the surface model creating module 110 of FIG. 1, the multi-depth-of-field image capturing device 112 may be disposed at an open end of the automation carrier 140 and is carried by the automation carrier 140. The automation carrier 140 may drive the multi-depth-of-field image capturing device 112 to rotate and move in multiple axial directions within a set working range. An object TG to be analyzed or inspected may be placed within the working range of the automation carrier 140. Besides, in some embodiments, the object TG may be placed on a carrying platform CS. The carrying platform CS may be configured to be rotatable or movable, and the carrying platform CS may position the object TG within a working range of the surface model creating module 110. In this way, the object TG placed on the carrying platform CS may be rotated and translated horizontally, so that the surface model creating module 110 may completely analyze an entire three-dimensional surface of the object TG.

In another embodiment, the automation carrier 140 may be applied to the material inspection module 120 of FIG. 1. The nondestructive material inspection device in the material inspection module 120 may be disposed at the open end of the automation carrier 140, and the automation carrier may communicate with and be connected to the processing module 130. In some embodiments, the object TG may be placed on the carrying platform CS. The carrying platform CS may be configured to be rotatable or movable, and the carrying platform CS may position the object TG within a working range of the nondestructive material inspection device. In this way, the automation carrier 140 may drive the nondestructive material inspection device in the material inspection module 120 to perform analysis along the inspection points determined by the processing module 130 In other embodiments, the nondestructive material inspection device in the material inspection module 120 and the multi-depth-of-field image capturing device 112 of the surface model creating module 110 may both be installed on the same automation carrier 140. Therefore, application of the automation carrier 140 is not limited to the manner described above.

Figure 3:
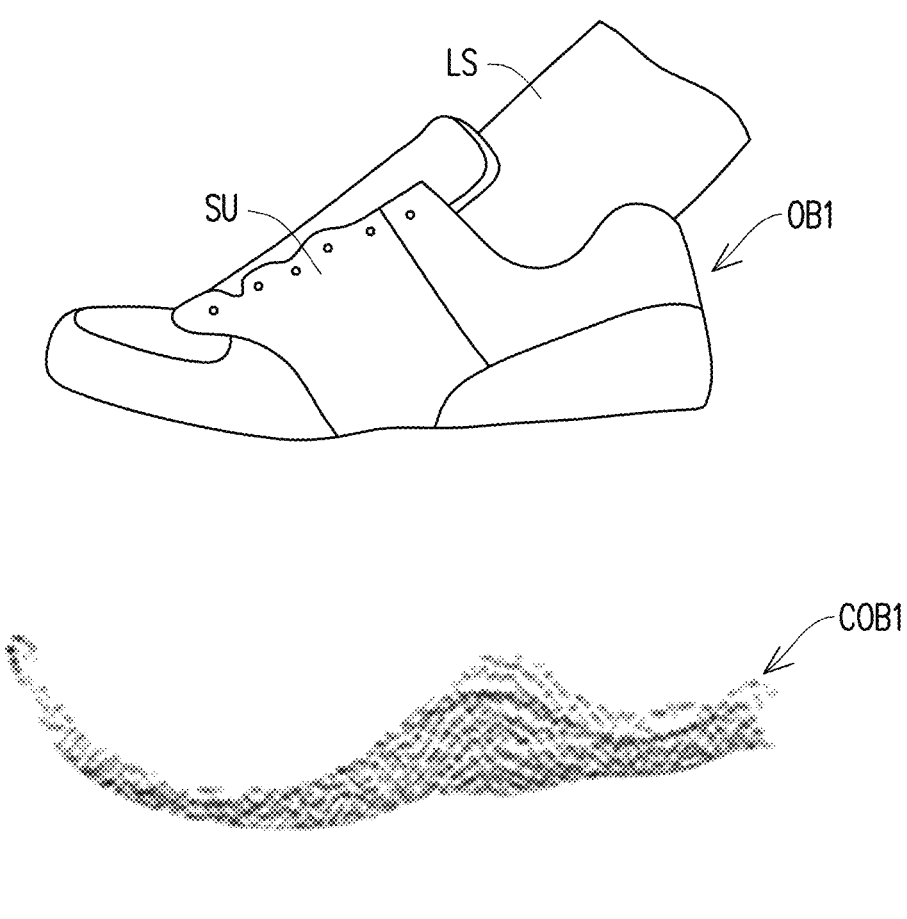
FIG. 3 is a schematic view of a first part and surface model data according to an exemplary embodiment of the disclosure.

FIG. 3 is a schematic view of a first part and surface model data according to an exemplary embodiment of the disclosure. With reference to FIG. 1 and FIG. 3 together, a first part OB1 of this embodiment is, for example, an upper SU sleeved on a shoe last LS. Nevertheless, in other embodiments, the first part OB1 may be other objects and is not limited thereto. The first part OB1 may be placed within the working range of the surface model creating module 110 of the system 100, so that the surface model creating module 110 may capture appearance information of the first part OB1. In some embodiments, after capturing the appearance information of the first part OB1, the surface model creating module 110 may convert the appearance information into a first part point cloud COB1 and transmits information of the first part point cloud COB1 to the processing module 130. In some other embodiments, the appearance information of the first part OB1 captured by the surface model creating module 110 may be transmitted to the processing module 130, and the appearance information of the first part OB1 is converted into the first part point cloud COB1 by the processing module 130.

Figure 4:
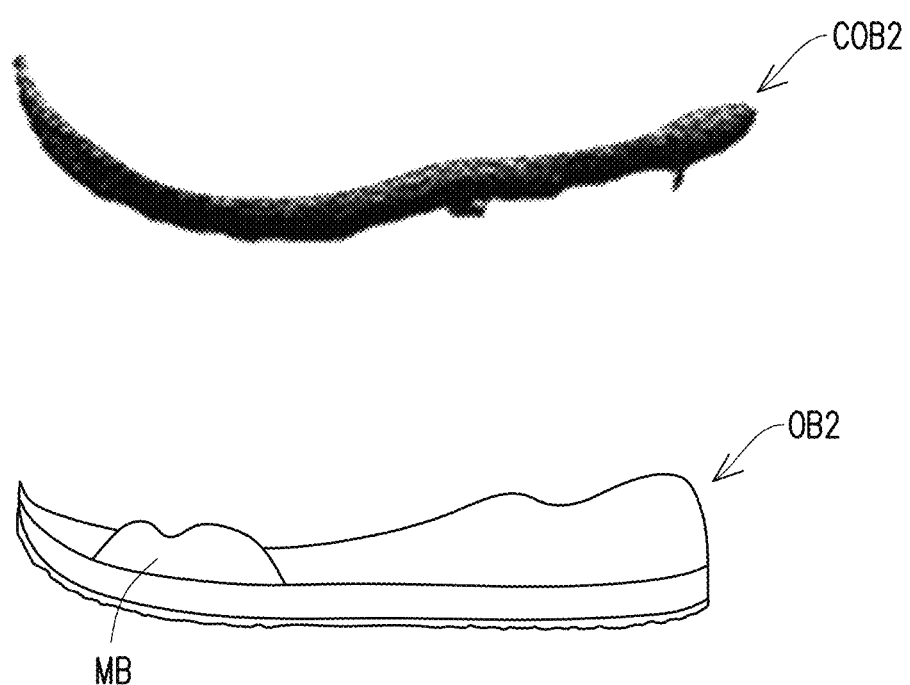
FIG. 4 is a schematic view of a second part and surface model data according to an exemplary embodiment of the disclosure.

FIG. 4 is a schematic view of a second part and surface model data according to an exemplary embodiment of the disclosure. With reference to FIG. 1 and FIG. 4 together, a second part OB2 of this embodiment is, for example, a sole model MB. The sole model MB herein is a model which may be repeatedly used and is applied in a shoe production process. The sole model MB may be temporarily assembled with different uppers to facilitate establishment of an upper processing area and a processing path. In other words, the final finished footwear object may not include the sole model MB, and the sole model MB may be treated as an auxiliary tool in the manufacturing process. Nevertheless, in other embodiments, the second part OB2 may be other objects and is not limited to be the sole model MB.

The second part OB2 may be placed within the working range of the surface model creating module 110 of the system 100, so that the surface model creating module 110 may capture appearance information of the second part OB2. In some embodiments, after capturing the appearance information of the second part OB2, the surface model creating module 110 may convert the appearance information into a second part point cloud COB2 and transmits information of the second part point cloud COB2 to the processing module 130. In some other embodiments, the appearance information of the second part OB2 may be transmitted to the processing module 130 after being captured by the surface model creating module 110, and the appearance information of the second part OB2 is converted into the second part point cloud COB2 by the processing module 130. In addition, each point in the first part point cloud COB1 and the second part point cloud COB2 may include coordinate information and intensity information to present an appearance feature of the scanned first part OB1 and/or second part OB2, but is not limited thereto.

In FIG. 3 and in FIG. 4, the first part point cloud COB1 may correspond to a locally selected region of the first part OB1 and does not have to present the entire first part OB1. Moreover, the second part point cloud COB2 may correspond to a locally selected region of the second part OB2 and does not have to present the entire second part OB2. In other embodiments, the entire point cloud of the first part OB1 and/or the entire point cloud of the second part OB2 may selectively be established according to actual needs for subsequent processes.

In some embodiments, each of the first part point cloud COB1 and the second part point cloud COB2 may be formed by two or more than two point clouds. For instance, when the first part OB1 is scanned, a portion of the first part OB1 (e.g., the first ⅔ segment) may be scanned first so that a point cloud of a local portion of the first part OB1 is obtained, and a point cloud of another local portion may also be obtained when another portion of the first part OB1 (e.g., the last ⅔ segment) is scanned in another scanning step. Next, an algorithm is performed, such as an iterative closest point (ICP) algorithm, to stitch the point clouds of the two local portions together, and that the complete first part point cloud COB1 is obtained.

Figure 5:
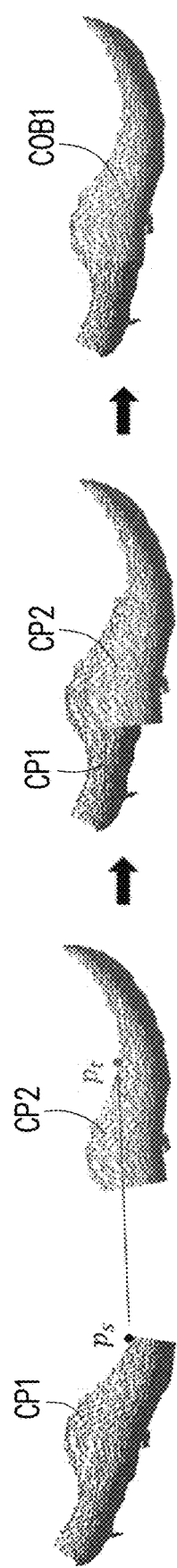
FIG. 5 is a schematic view of establishment of point clouds of a surface model according to an exemplary embodiment of the disclosure.

FIG. 5 is a schematic view of establishment of point clouds of a surface model according to an exemplary embodiment of the disclosure. With reference to FIG. 3 and FIG. 5, establishment of point clouds of a surface model of the first part OB1 is taken as an example for illustration in this embodiment, and the manner adopted by this embodiment may also be applied to establishment of point clouds of other surface models. In this embodiment, the surface model creating module 110 in system 100 of FIG. 1 may be adopted to scan a portion of the first part OB1 and to scan another portion of the first part OB1, so that a first local point cloud CP1 and a second local point cloud CP2 are respectively obtained. Next, a three-dimensional point cloud comparison technique may be implemented to stitch the first local point cloud CP1 and the second local point cloud CP2, and that the first part point cloud COB1 is obtained. Herein, the point cloud comparison technique may be the ICP algorithm, a general iterative closest point (G-ICP) algorithm, a fractional iterative closest point (F-ICP) algorithm, a point feature histogram (PFH) algorithm, a fast point feature histogram (FPFH) algorithm, or any other technique configured to perform model comparison.

For instance, one of the first local point cloud CP1 and the second local point cloud CP2 may be set as a target point cloud, and the other one is set as a source point cloud. Next, point cloud stitching is performed on two pieces of point cloud information having similar alignment angles. Herein, a conversion relationship between two point clouds may be represented as $p_t = R \cdot p_s + T$, where $p_t$ is the target point cloud (i.e., new point cloud information after fitting), $p_s$ is the source point cloud (i.e., raw point cloud information), R is, for example, a 3×3 rotation matrix, and T is, for example, a 3×1 translation matrix. Next, the ICP algorithm is adopted to look for a cloud set $p_t^i$ in the target point cloud, a corresponding adjacent point cloud $p_s^i$ is found in the source point cloud, and $\|p_t^i - p_s^i\| = \min$ is then required. Next, an error function $$f(R, T) = \frac{1}{N_p} \sum_{i=1}^{N_p} |p_t^i - R \cdot p_s^i - T|^2$$

is given, where $p_t^i p_s^i$ is a pair of point cloud corresponding points, and a total of $N_p$ pairs of point clouds are compared. Next, point cloud coordinates are updated by a coordinate conversion relationship calculated by the corresponding points or a feature comparison result, and the conversion relationship is, for example, $p_t' = R \cdot p_s + T$. Comparison may then be made one or multiple times by using an iterative formula or a weight calculation method corresponding to the above algorithm to update the point cloud comparison result. For instance, a least squares method may be adopted to calculate an average distance of $$d = \frac{1}{n} \sum_{i=1}^{n} \|p_t^{i'} - p_s^i\|^2$$

between a new conversion point cloud set $p_t'$ and an original point cloud $p_t$, where $p_t'$ is the new conversion point cloud, $p_t$ is the original cloud, and d is the average distance between the point clouds. If the average distance d is less than a given error threshold, the iteration ends and a rotation and translation matrix is obtained. Otherwise, iterative calculation is continued until the average distance d is less than the given error threshold. In this way, the first part point cloud COB1 may be established from the first local point cloud CP1 and the second local point cloud CP2.

Figure 6:
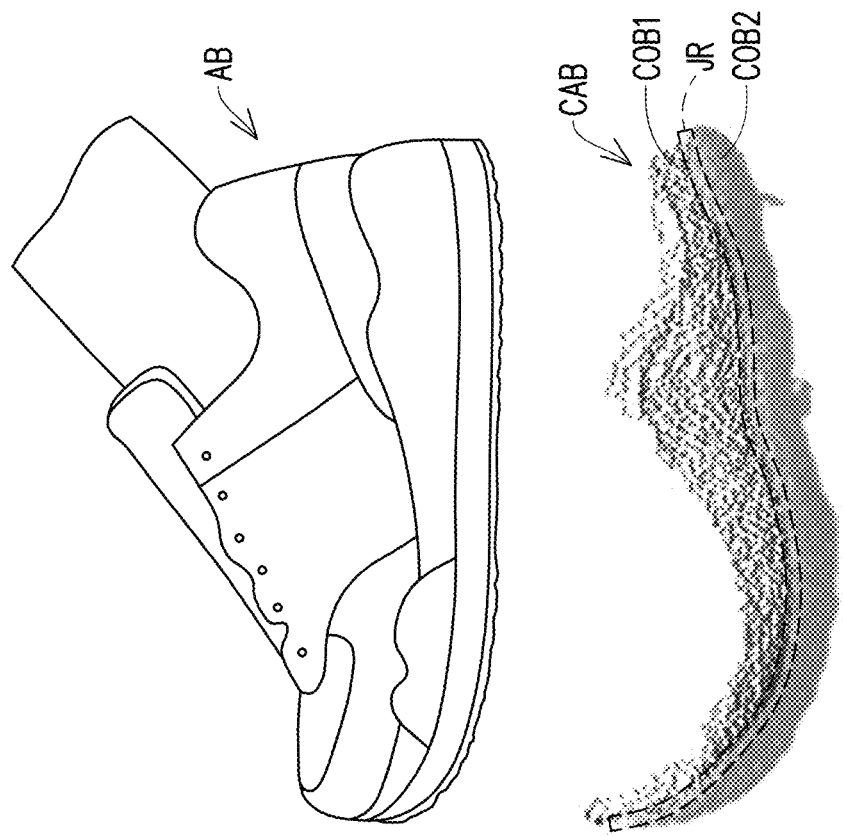
FIG. 6 is a schematic view of determination of a junction region between the first part and the second part according to an exemplary embodiment of the disclosure.
Figure 6:
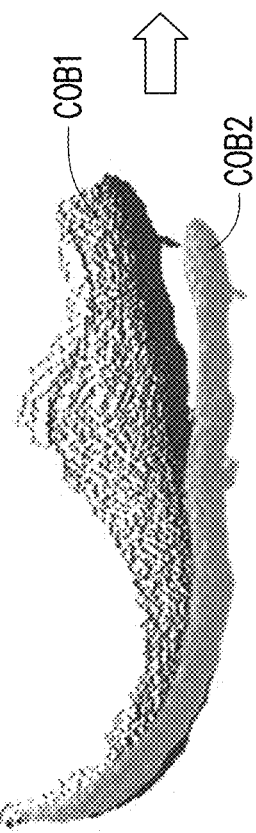

FIG. 6 is a schematic view of determination of a junction region between the first part and the second part according to an exemplary embodiment of the disclosure. With reference to FIG. 1 and FIG. 6, after the first part point cloud COB1 and the second part point cloud COB2 are obtained, the processor 132 in the processing module 130 may analyze and compare the first part point cloud COB1 and the second part point cloud COB2 and establishes an assembly point cloud CAB of an assembly AB combined and assembled by the first part OB1 and the second part OB2 through using a three-dimensional point cloud comparison technique such as an iterative method or weight calculation. The processing module 130 may further determine a junction region JR from the first part point cloud COB1, the second part point cloud COB2, and the assembly point cloud CAB through a technique of point cloud comparison and calculation. The junction region JR is a possible junction place determined through calculation from the first part point cloud COB1 and the second part point cloud COB2 when the first part OB1 and the second part OB2 are assembled into the assembly AB.

In some embodiments, the junction region JR may be determined by setting one of the first part point cloud COB1 and the second part point cloud COB2 as the target point cloud and the other one as the source point cloud; looking for the point cloud point $p_t^i$ in the target point cloud, looking for the adjacent point cloud point $p_s^i$ in the source point cloud, and requiring $\|p_t^i - p_s^i\| = \min$; giving the error function of $$f(R, T) = \frac{1}{N_p} \sum_{i=1}^{N_p} |p_t^i - R \cdot p_s^i - T|^2,$$

where $p_t^i p_s^i$ is a pair point cloud corresponding points, a total of $N_p$ pairs of point cloud corresponding points are compared, R is, for example, a 3×3 rotation matrix, and T is, for example, a 3×1 translation matrix; substituting a rotation and translation matrix calculated by the corresponding points into the $p_t' = R \cdot p_s + T$ and updating the point cloud coordinates; adopting the least squares method to calculate the average distance of $$d = \frac{1}{n}\sum_{i=1}^{n} \|p_t^{i'} - p_s^i\|^2$$

between the new conversion point cloud set $p_t{'}$ and the original point cloud $p_t$; and giving a threshold. The iteration may be ended if the average distance d is less than the threshold, and the optimal rotation and translation matrix may be solved. In this way, the junction region JR may be established from the first part point cloud COB1 and the second part point cloud COB2. FIG. 5 and FIG. 6 are merely examples illustrating implementation of the three-dimensional point cloud comparison technique, but the disclosure is not limited thereto. In other embodiments, any kind of technique configured for model comparison and any kind of technique capable for analyzing and combining point clouds of two surface models may be applied to any embodiment of the disclosure.

Figure 7:
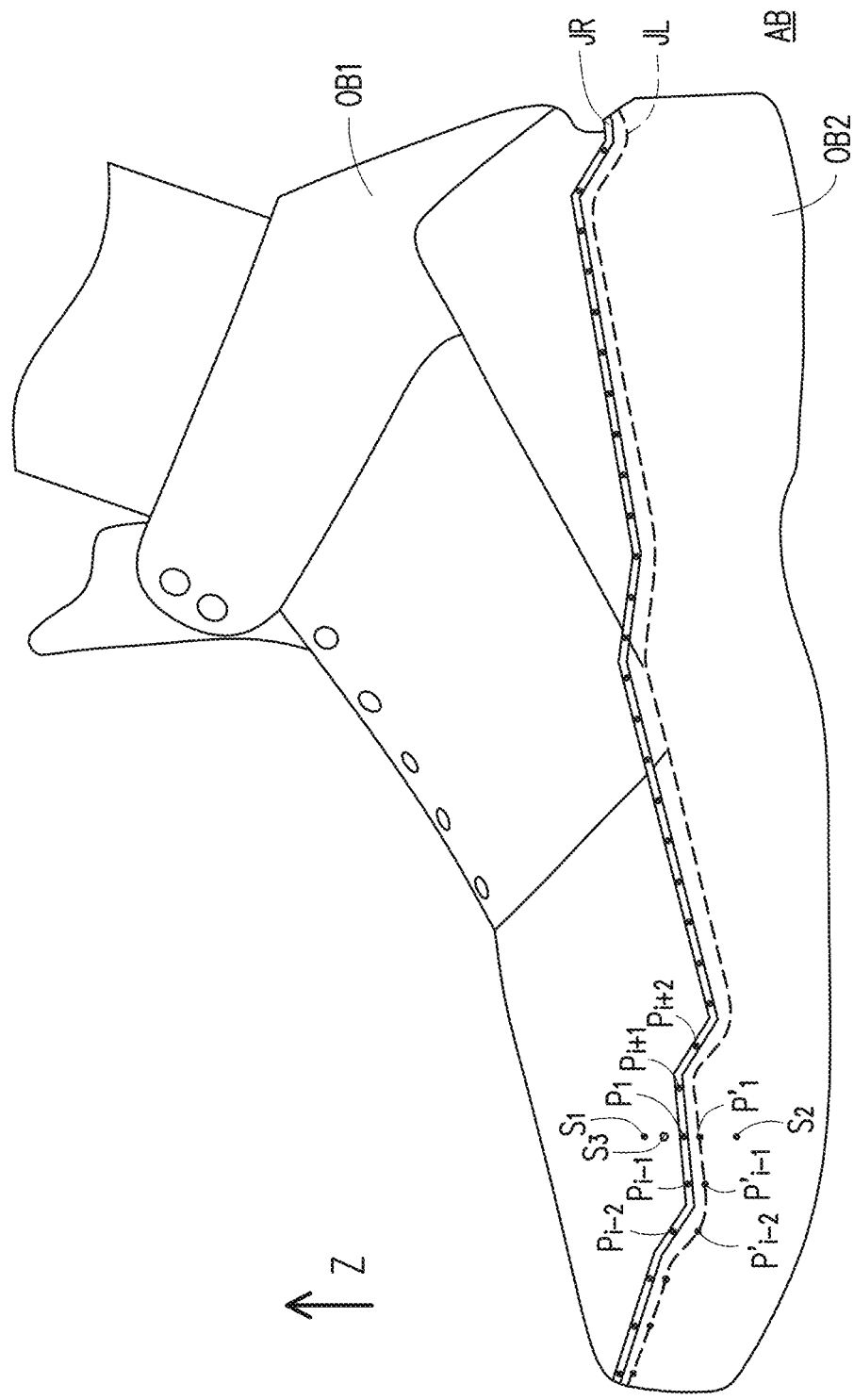
FIG. 7 is a schematic view of an assembly according to an exemplary embodiment of the disclosure.
Figure 8:
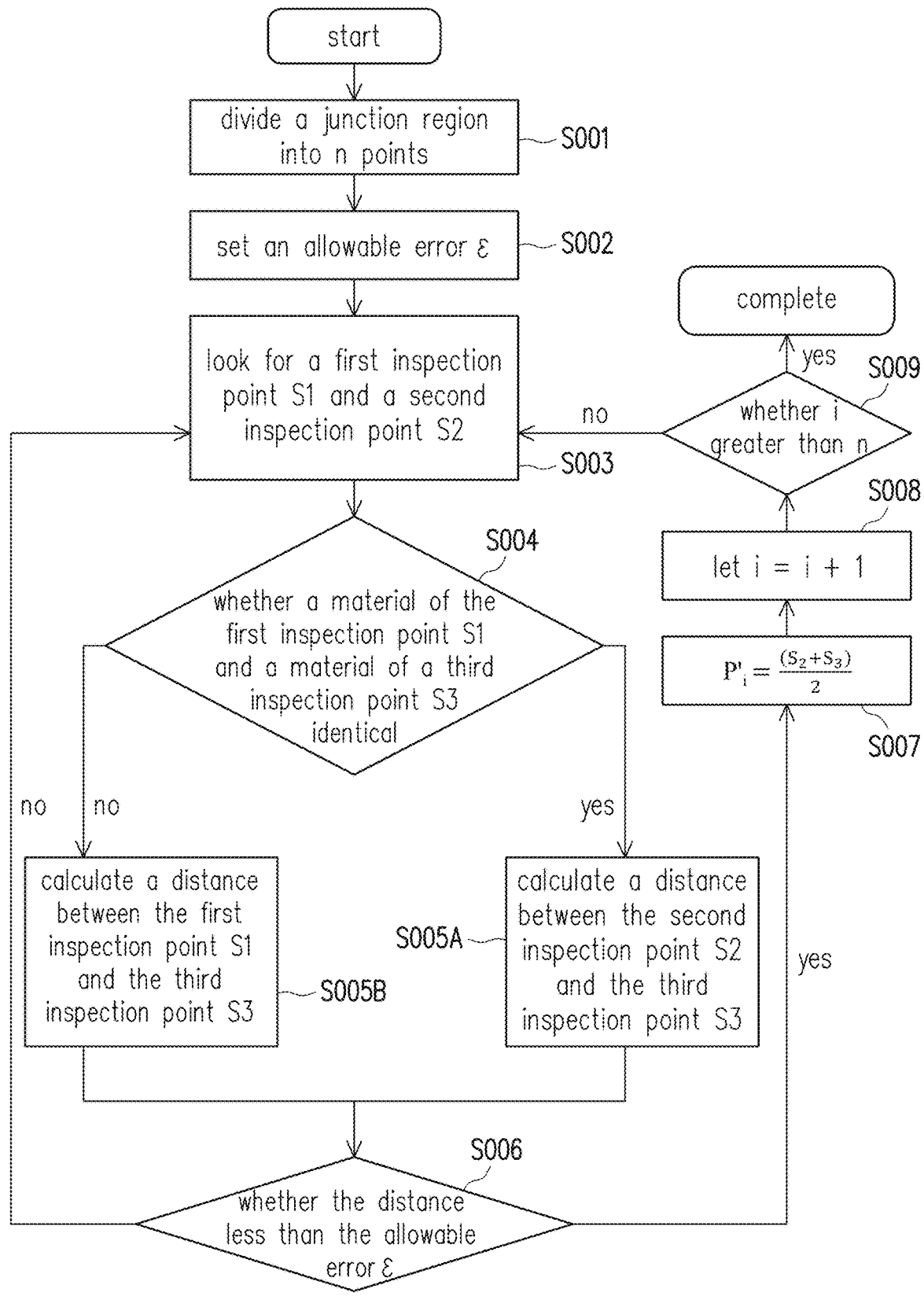
FIG. 8 is a schematic flow chart for establishing a junction trace of an assembly according to an exemplary embodiment of the disclosure.

FIG. 7 is a schematic view of an assembly according to an exemplary embodiment of the disclosure, and FIG. 8 is a schematic flow chart for establishing a junction trace of an assembly according to an exemplary embodiment of the disclosure. According to some embodiments of the disclosure, after the junction region JR is determined from the assembly point cloud CAB of FIG. 6, the processing module 130 in the system 100 of FIG. 10 may determine inspection points according to information of the junction region JR. Moreover, the material inspection module 120 may inspect materials of the assembly AB at the selected inspection points. Next, a result of inspection performed by the material inspection module 120 may be used to determine a junction trace JL between the first part OB1 and the second part OB2 in the assembly AB.

With reference to FIG. 7 and FIG. 8, after the assembly point cloud CAB of FIG. 6 is established, establishment of the junction trace JL may then be started. In step S001, the junction region JR in the assembly point cloud CAB may be divided in to n points, and the points are sequentially numbered from P1 to Pn. The numeral value of n may be a positive integer, and such value may be determined according to factors such as a size and application of the assembly AB. For instance, when the assembly AB is applied as a footwear product and the first part OB1 and the second part OB2 are respectively a last-stretched upper and a sole model, the numerical value of n may be determined according to a perimeter of the sole model or a length of the junction region, which is not limited thereto. Alternatively, in some embodiments, the value of n may be selectively determined so that each distance between points may be set to be less than a predetermined distance (e.g., a range from 0.1 mm to 1 mm, from 0.3 mm to 0.8 mm, or from 0.4 mm to 0.6 mm), but is not limited thereto.

In step S002, an allowable error ε is set. In some embodiments, the allowable error ε may be determined based on sizes of the first part OB1, the second part OB2, and the assembly AB as well as a stitching and combination relationship between the first part OB1 and the second part OB2. For instance, when the assembly AB is applied as a footwear product and the first part OB1 and the second part OB2 are respectively a last-stretched upper and a sole model, the allowable error ε may be a range from 0.1 mm to 1 mm, from 0.3 mm to 0.8 mm, or from 0.4 mm to 0.6 mm, but is not limited thereto.

Next, a $P_i^{th}$ point may be set as a configuration point, and a curved surface variation of the assembly AB near the configuration point is analyzed in a Z-axis direction, so that a surface contour is obtained. In some embodiments, the Z-axis direction may intersect with the junction region JR, and when the curved surface variation of the assembly AB is analyzed in the Z-axis direction, an analysis path may cross the second part OB2 from the first part OB1. In addition, an analysis range of analyzing the curved surface variation of the assembly AB in the Z-axis direction may be greater than a range of the junction region JR.

Next, in step S003, a first inspection point $S_1$ and a second inspection point $S_2$ are found. In this embodiment, a point separated from the $P_i$ point on the surface contour by a first separation distance in a positive direction of the Z axis is treated as the first inspection point $S_1$, and a point separated from the $P_i$ point by a second separation distance in a negative direction of the Z axis is treated as the second inspection point $S_2$. In some embodiments, the first separation distance and the second separation distance may be identical, but in other embodiments, the two separation distances may be different from each other. The first separation distance and the second separation distance may be greater than half a width of the junction region JR in the Z-axis direction. That is, the first inspection point $S_1$ and the second inspection point $S_2$ may be located outside the junction region JR.

The material inspection module 120 may inspect materials of the assembly AB at the first inspection point $S_1$ and the second inspection point $S_2$ and may inspect a material of a third inspection point $S_3$ between the first inspection point $S_1$ and the second inspection point $S_2$. In some embodiments, a coordinate height of the third inspection point $S_3$ may be an average height of a coordinate height of the first inspection point $S_1$ and a coordinate height of the second inspection point $S_2$. In some other embodiments, the third inspection point $S_3$ may be a point located between the first inspection point $S_1$ and the second inspection point $S_2$. The first inspection point $S_1$ and the second inspection point $S_2$ may respectively located on the first part OB1 and the second part OB2. The third inspection point $S_3$ is not limited to be located on the first part OB1 or the second part OB2.

In some embodiments, a material of the first part OB1 may include a fabric material such as cloth, leather, and so on, and a material of the second part OB2 may include epoxy resin, a foaming material, and so on. In other words, the materials of the first part OB1 and the second part OB2 are significantly different. Therefore, after the materials of the assembly AB at the first inspection point $S_1$, the second inspection point $S_2$, and the third inspection point $S_3$ are inspected, the materials of the assembly AB at the first inspection point $S_1$, the second inspection point $S_2$, and the third inspection point $S_3$ are compared. In this way, a junction of the first part OB1 and the second part OB2 is determined. Further, the junction of the first part OB1 and the second part OB2 may fall between two points among the first inspection point $S_1$, the second inspection point $S_2$, and the third inspection point $S_3$ when different materials are inspected. In some embodiments, a distance between the two points may be calculated among the first inspection point $S_1$, the second inspection point $S_2$, and the third inspection point $S_3$ when different materials are inspected. When the distance of the two points having different materials is less than the predetermined allowable error, a middle point between the two points having different materials may be treated as a junction coordinate point of a junction trace, but is not limited thereto.

In some embodiments, after the first inspection point $S_1$, the second inspection point $S_2$, and the third inspection point $S_3$ are found, the materials of the first inspection point $S_1$ and the third inspection point $S_3$ may be inspected. Step S004 is then performed, and it is determined that whether the material of the first inspection point $S_1$ and the material of the third inspection point $S_3$ are identical. If the inspected materials of the first inspection point $S_1$ and the third inspection point $S_3$ are identical, step S005A may be performed, and a distance between the second inspection point $S_2$ and the third inspection point $S_3$ is calculated. If the inspected materials of the first inspection point $S_1$ and the third inspection point $S_3$ are different, step S005B may be performed, and a distance between the first inspection point $S_1$ and the third inspection point $S_3$ is calculated. At this time, inspection of the material of the second inspection point $S_2$ may be omitted, but is not limited thereto.

Next, as shown in step S006, it is determined that whether the calculated distance is less than the allowable error $\varepsilon$. If the distance is less than the allowable error $\varepsilon$, step S007 is then performed, and a junction coordinate point $$P'_i = \frac{(S_2 + S_3)}{2}$$

is determined. If the calculated distance is greater than the allowable error $\varepsilon$, step S003 is performed again. If step S003 is performed after step S006, the first separation distance and the second separation distance may be adjusted. For instance, the first separation distance and the second separation distance may be reduced to update the first inspection point, the second inspection point, and the third inspection point, and step S003 is then performed until the junction coordinate point $P'_i$ is obtained.

After step S007 is completed, let i=i+1 as shown in step S008 and S009, and it is determined that whether the newly obtained i is greater than n. If the newly obtained i is not greater than n, step S003 is continuously performed to obtain junction coordinate points $P'_i \ldots P'_{i-1}$, and $P'_{i-2}$ corresponding to the n points of $P_{i+1}$ point, $P_{i+2}$ point, $\ldots P_{i-2}$ point, and $P_{i-1}$ point. If the newly obtained i is greater than n, it means that the junction coordinate points $P'_i \ldots P'd$, and $P'_{i-2}$ corresponding to the n points are all obtained, and that the calculation and analysis process is completed. After the junction coordinate points $P'_i \ldots P'_{i-1}$, and $P'_{i-2}$ corresponding to the n points are obtained, the junction trace JL may then be established by using the junction coordinate point $P'_i$ calculated through the n points.

According to the above steps, after the point clouds of the surface models of the first part OB1 and the second part OB2 are established by the surface model creating module 110 of the system 100, the junction region JR may be determined from the first part point cloud COB1 and the second part point cloud COB2. Next, the inspection points are determined according to the junction region JR, so that the material inspection module 120 may inspect the materials of the inspection points of the assembly AB. Next, the junction trace JL is determined based on a material inspection result. In this way, the junction trace JL is not determined solely by a surface model established by a visual system. Instead, the materials of the assembly AB are further analyzed, and the junction trace JL is determined from a result of material analysis. Therefore, the junction trace JR established by the system 100 is similar to an actual junction on the assembly AB, so that accuracy of the subsequent processing process of the assembly AB is improved.

In some embodiments, the first part OB1 in the assembly AB is a last-stretched upper, and the second part OB2 is a sole model. The first part OB1 and the second part OB2 may partially overlap when being assembled together, and the first part OB1 may be partially shielded by the second part OB2. In some embodiments, the junction trace JL is, for example, a trace line along an edge of the second part OB2 adjacent to the first part OB1. A last-stretched upper is formed by a flexible material, so when being temporally assembled with a sole model, the last-stretched upper may be deformed caused by pressure of assembling. As such, if the junction trace JL is determine based solely on the point cloud of the last-stretched upper established by the surface model creating module 110, deformation of each part generated during assembling may not be estimated, and an incorrect result is thereby produced. In other words, in the system 100, the junction region JR may be determined based on the point cloud of each part first, and then each point of the junction region JR may be calibrated or adjusted according further to the inspection result provided by the material inspection module 120, and in this way, the junction trace JL similar to the actual junction is established. After establishment of the junction trace JL is completed, the assembly AB may be separated, and any part of the assembly AB is processed. For instance, the last-stretched upper may be processed, and a working path may be planned according to the junction trace JL in the process of processing the last-stretched upper. In some embodiments, the process of processing the last-stretched upper includes a glue-spraying process, and spraying of a glue material may be set to be performed on a portion of the last-stretched upper below the junction trace JL in the glue-spraying process, but is not limited thereto.

In view of the above, in the system for establishing the junction trace of the assembly provided by the embodiments of the disclosure, the material inspection module is included. In the embodiments of the disclosure, the junction trace is determined by the visual system (e.g., the surface model creating module) according to the appearance model (e.g., the point cloud) of each part of the assembly, and the material inspection result is further adopted to facilitate establishment of the junction trace. In this way, even if the parts forming the assembly are deformed or displaced when being assembled, the system provided by the embodiments of the disclosure may still correctly determine the junction of the two parts. In other words, in the embodiments of the disclosure, the part junction may be correctly established through the system for establishing the junction trace of the assembly. Therefore, when the junction trace established by the system provided by the embodiments of the disclosure is applied to other manufacturing or processing processes, the manufacturing yield is increased.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A system for establishing a junction trace of an assembly, wherein the assembly comprises a first part and a second part assembled with each other, and the system comprises:
    a surface model creating module, scanning the first part and the second part to establish first surface model data of the first part and second surface model data of the second part;

a processing module, establishing assembled surface model data according to the first surface model data and the second surface model data, determining a junction region from the assembled surface model data, and determining inspection points mapped on the assembly according to the junction region, wherein the inspection points comprise a first inspection point separated from a configuration point by a first separation distance, a second inspection point separated from the configuration point by a second separation distance, and a third inspection point located between the first inspection point and the second inspection point, and the configuration point is located within the junction region; and a material inspection module, inspecting materials of the assembly at the inspection points, wherein the processing module establishes a junction trace of the first part and the second part in the assembly according to an inspection result of the material inspection module.

2. The system as claimed in claim 1, wherein the material inspection module comprises a nondestructive material inspection device.

3. The system as claimed in claim 2, wherein the material inspection module comprises an X-ray fluorescence spectrometer (XRF), an atomic force microscope (AFM), a conductive atomic force microscope (C-AFM), a cross section polisher (CP), a scanning electron microscope/energy-dispersive X-ray spectroscopy (SEM/EDS), dual-beam focused ion beam/energy-dispersive X-ray spectroscopy (DB FIB/EDS), or a transmission electron microscope/energy-dispersive X-ray spectroscopy (TEM/EDS).

4. The system as claimed in claim 2, wherein the material inspection module further comprises an automation carrier, and the automation carrier carries the nondestructive material inspection device.

5. The system as claimed in claim 4, wherein the automation carrier comprises a multi-axis robot arm.

6. The system as claimed in claim 1, wherein the surface model creating module comprises a multi-depth-of-field image capturing device.

7. The system as claimed in claim 6, wherein the surface model creating module further comprises an automation carrier, and the automation carrier carries the multi-depth-of-field image capturing device.

8. The system as claimed in claim 7, wherein the automation carrier comprises a multi-axis robot ann.

9. The system as claimed in claim 1, further comprising a carrying platform, canying the assembly and positioning the assembly within a working range of the material inspection module or the surface model creating module.

10. The system as claimed in claim 1, wherein the processing module comprises a processor and a storage unit, the storage unit stores the first surface model data and the second surface model data, and the processing module compares and analyzes the first surface model data and the second surface model data to establish the assembled surface model data, determines the junction region from the assembled surface model data, and determines inspection points mapped on the assembly according to the junction region.

11. A method for establishing a junction trace of an assembly, comprising:

scanning a first part and a second part of the assembly to establish first surface model data of the first part and second surface model data of the second part;

establishing assembled surface model data according to the first surface model data and the second surface model data, determining a junction region from the assembled surface model data, and determining inspection points mapped on the assembly according to the junction region, wherein the inspection points comprise a first inspection point separated from a configuration point by a first separation distance, a second inspection point separated from the configuration point by a second separation distance, and a third inspection point located between the first inspection point and the second inspection point, and the configuration point is located within the junction region;

inspecting materials of the assembly at the inspection points; and establishing a junction trace of the first part and the second part in the assembly according to a material inspection result.

12. The method as claimed in claim 11, wherein the method for establishing the assembled surface model data comprises an iterative closest point (ICP) algorithm, a general iterative closest point algorithm, a fractional iterative closest point algorithm, a point feature histogram algorithm, a fast point feature histogram algorithm, or a combination of the foregoing algorithms.

13. The method as claimed in claim 11, further comprising setting an allowable error and comparing materials inspected at the first inspection point and the third inspection point.

14. The method as claimed in claim 13, wherein a distance between the second inspection point and the third inspection point is calculated when the materials inspected at the first inspection point and the third inspection point are identical.

15. The method as claimed in claim 14, wherein a middle point between the second inspection point and the third inspection point is determined as a junction coordinate point of the junction trace when the distance is less than the allowable error.

16. The method as claimed in claim 14, wherein the first separation distance and the second separation distance are reduced when the distance is greater than the allowable error so as to update the first inspection point, the second inspection point, and the third inspection point.

17. The method as claimed in claim 13, wherein a distance between the first inspection point and the third inspection point is calculated when the materials inspected at the first inspection point and the third inspection point are different.

18. The method as claimed in claim 17, wherein a middle point between the first inspection point and the third inspection point is determined as a junction coordinate point of the junction trace when the distance is less than the allowable error.

19. The method as claimed in claim 17, wherein the first separation distance and the second separation distance are reduced when the distance is greater than the allowable error so as to update the first inspection point, the second inspection point, and the third inspection point.

* * * * *